United States Patent
Castaneda et al.

[19]

[11] Patent Number: 5,749,457
[45] Date of Patent: May 12, 1998

[54] ELECTRONIC DEVICE WITH SWITCH AND PIVOTABLE ACTUATOR ASSEMBLY

[75] Inventors: Julio C. Castaneda, Coral Springs; Troy V. Frandsen, Sunrise; Paul M. Greco, Boca Raton, all of Fla.

[73] Assignee: Motorola Inc., Schaumburg, Ill.

[21] Appl. No.: 774,047

[22] Filed: Dec. 23, 1996

[51] Int. Cl.⁶ ..................................... H01H 3/12
[52] U.S. Cl. ........................... 200/343; 267/154
[58] Field of Search ..................... 200/343, 335; 400/491.2, 495, 495.1; 267/279, 280, 154

[56] References Cited

U.S. PATENT DOCUMENTS

| | | | |
|---|---|---|---|
| 2,821,582 | 1/1958 | Kimball et al. | 200/343 X |
| 4,054,766 | 10/1977 | Kramer | 200/343 X |
| 4,394,555 | 7/1983 | Long et al. | 200/343 X |
| 4,845,325 | 7/1989 | Burchett et al. | 200/302.2 |
| 4,877,925 | 10/1989 | Kobayashi | 200/343 X |
| 5,003,133 | 3/1991 | Kobayashi et al. | 200/343 X |

*Primary Examiner*—Renee S. Luebke
*Attorney, Agent, or Firm*—Andrew S. Fuller

[57] ABSTRACT

An electronic device (100) includes an internally mounted circuit substrate (110) having a surface (111) with mounted electrical components (130), including a flat switch (132) having a direction of actuation (201) substantially perpendicular to the surface. The electronic device (100) includes an actuator button (150) with an externally accessible user interface portion (151) and an internally positioned actuator member (155). The actuator member (155) is pivotable from a first position adjacent to the switch (132), to a second position engaging and actuating the switch (132) when the user interface portion (151) is depressed. Preferably, the actuator button (150) is attached to a device housing member (121, 122) using an integrally formed shaft (180) that provides a spring bias return force for the button (150) when depressed.

16 Claims, 2 Drawing Sheets

5,749,457

1

ELECTRONIC DEVICE WITH SWITCH AND PIVOTABLE ACTUATOR ASSEMBLY

TECHNICAL FIELD

This invention relates in general to electronic devices with switch assemblies, and more particular, to switch and actuator assemblies.

BACKGROUND OF THE INVENTION

Many electronic devices have internally mounted switches that are actuated by control buttons having an external interface. Generally, a switch, or a portion thereof, is located on a circuit board which is mounted within an electronic device. A button or similar actuator is situated on the electronic device such that an interface portion is externally accessible to a user, and an actuator portion positioned adjacent to the switch. When the user depresses the interface portion, the actuator portion engages and actuates the switch.

An electronic device may have switch actuator buttons incorporated at various locations on the device housing for ergonomic and other purposes. For example, on a handheld portable radio, side mounted volume control and push-to-talk actuators are common. However, the desired location of the actuators may not coincide well with the desired locations of the switches to be actuated. For instance, it may be desirable to actuate a switch located on a circuit board having a particular orientation, with a corresponding actuator button oriented to have a direction of actuation that does not coincide with that of the switch. One prior art solution has been to mount the switch on the circuit board to have an actuation orientation that coincides with that of the actuator button. For instance, a switch may be side mounted on the circuit board in a ninety degree (90°) orientation. When compared to flat mounted switches, side mounted switches tend to be more expensive, require larger assembly tolerance windows, require more space, and are more susceptible to damage from mechanical shock.

In another prior art approach, a side mounted actuator is accommodated by locating the switch on a flexible circuit which is interconnected with the circuit board. The flexible circuit is located to properly orient the switch adjacent to the actuator. This approach, while offering much flexibility, tends to be more expensive and tends to require a higher part count.

It is desirable to provide for an electronic device with a switch and actuator assembly that is inexpensive and flexible. The switch and actuator assembly should accommodate the positioning of a switch actuator at various locations on the electronic device.

DETAILED DESCRIPTION OF THE PREFERRED EMBODIMENT

The present invention provides for an electronic device with a switch and pivotable actuator assembly. The assembly includes a circuit carrying substrate having a surface with electrical components thereon. The electrical components include a switch having a direction of actuation substantially perpendicular to the surface of the substrate. A pivotable actuator button is positioned to selectively actuated the switch. The button has a user interface surface and an actuator member. The button is responsive to a force exerted on the user interface surface to pivot the actuator member such that the actuator member causes actuation of the switch. The actuator button is preferably formed from resilient and elastic material in a one-piece construction, and is anchored to a housing member by an integral shaft, such that there is a spring bias return force exerted on the actuator button by the integral shaft, when the actuator button is depressed to actuate the switch.

Figure 1:
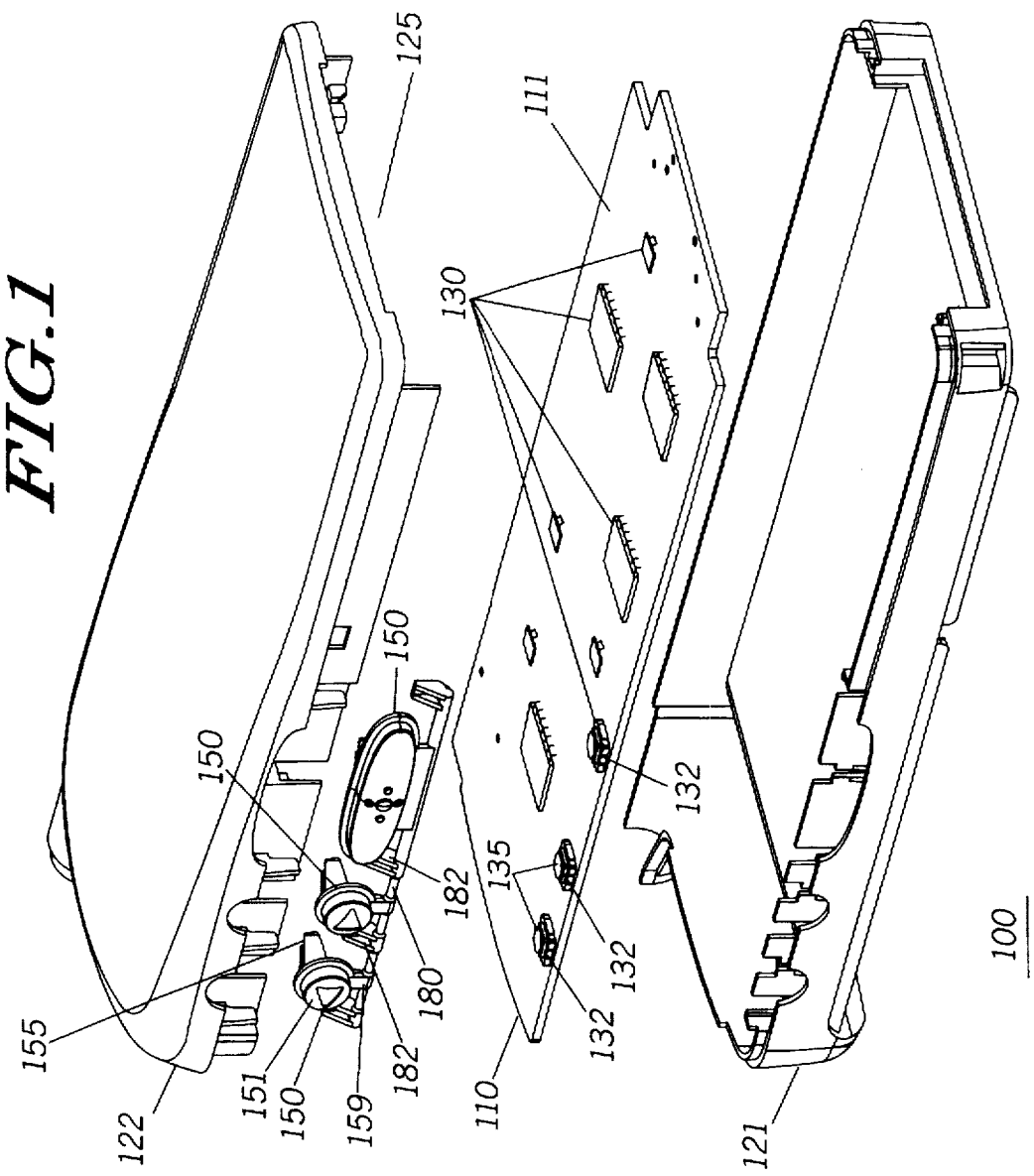
FIG. 1 is an exploded perspective view of an electronic device incorporating a switch and actuator assembly, in accordance with the present invention.
Figure 2:
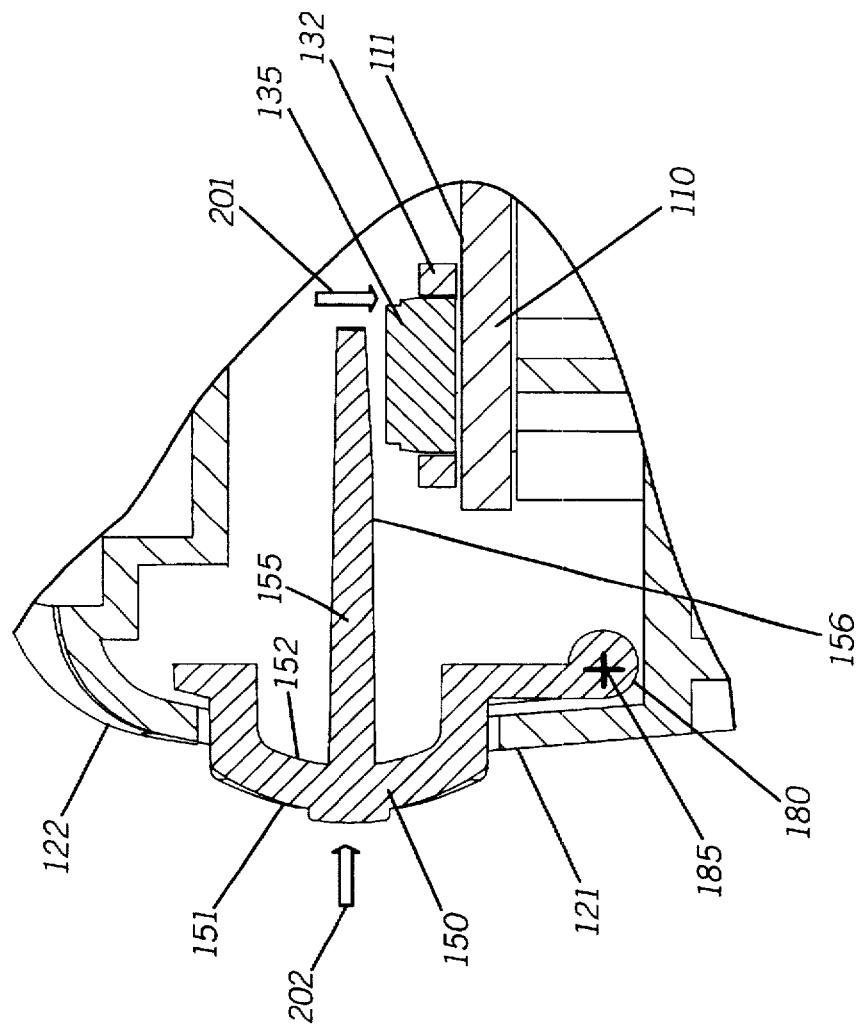
FIG. 2 is a fragmentary cross-sectional view of the electronic device of FIG. 1.

FIG. 1 is an exploded perspective view of an electronic device, in accordance with the present invention. FIG. 2 is a fragmentary cross-sectional view of the electronic device. Referring to FIGS. 1 and 2, the electronic device 100 is a two-way portable radio having communication circuitry for communicating over radio frequency channels. The radio 100 houses internal and external components, including a switch and actuator assembly, in accordance with the present invention. The radio 100 has front and back housing members 121, 122 that are mated together to form a device housing that includes an interior compartment 125. A circuit carrying substrate 110 is mounted within the interior compartment of the device housing 121, 122 and carries communication circuitry. Preferably, the circuit carrying substrate 110 is a printed circuit board having a planar surface 111 on which electrical components 130 are mounted. The electrical components 130 include switches 132 which are mounted to the planar surface 111 of the circuit board 110. Preferably, the switches 132 are discrete momentary switches that are mounted to the circuit board 110 with a flat orientation, such that the switches have a direction of actuation 201 substantially perpendicular to the planar surface of the circuit board. This type of switch is referred to herein as a flat switch or a flat mount switch, and is distinguished, for example, from a side mount switch that has a direction actuation substantially angled from a direction perpendicular to the surface of the circuit substrate on which it is mounted.

In the preferred embodiment, each switch 132 has an integral switch member 135, such as a switch actuating button, that is movable in a direction normal or perpendicular to the surface 111 of the circuit board 110. The integral switch member 135 causes actuation of the switch 132 when the switch member 135 is depressed toward the surface of the circuit board, i.e., the direction of actuation 201. Such switches are available in a variety of forms including popple switches, and other similar type of discrete switches.

According to the present invention, the radio 100 includes pivotable actuator buttons 150 for actuating the switches 132 on the circuit board 110. In the preferred embodiment, each actuator button 150 includes a user interface portion accessible from the exterior of the device housing 121, 122, and an actuating member portion positioned within the device housing 121, 122 adjacent to a corresponding switch 132. The button 150 is formed to have two opposing surfaces 151, 152, one surface 151 forming the user interface portion and the other surface 152 having a projection 155 that forms the actuator member. Preferably, the actuator member 155 has an actuator surface 156 that is substantially perpendicular to the user interface surface 151. Each button 150 is integrally attached to a shaft 180 by a wall portion 159 at one end, in a cantilever-like manner, such that the button 150, including the actuator member 155, is pivotable with respect the shaft 180 about axis 185. The shaft 180 is anchored, or otherwise mechanically coupled, to the device housing 121, 122 via retainers 182 integral to the shaft on either side of each button 150. The bending and rotation of the wall portion 159 and shaft 180 provide an opposing spring bias return force for the interface portion 151 and actuator member 155 when the interface portion 151 is depressed. The buttons are preferably formed together with the shaft from resilient and elastic material is a single-piece continuous construction, such as by molding, from a thermoplastic polycarbonate material.

In the preferred embodiment, the actuator buttons 150 are mounted on the device housing 121, 122 in a side button orientation such that the user interface portion 151 is depressible in a direction 202 substantially angled from the direction of actuation 201 of the corresponding switch 132. The actuator button is assembled to the device housing such that the actuator member is positioned adjacent to the switch. The actuating member is pivotable from this position to a position engaging the switch when the user interface portion is depressed in a direction 202 substantially parallel to the planar surface of the circuit board. When the actuator member is in the second position, the integral switch member is engaged and depressed so as to actuate the switch.

In operation, force is applied to the button in a direction 202 which is substantially orthogonal or 90 degrees, from the direction of actuation 201 of the switch. The actuator button 150 is responsive to the force exerted in a direction normal to the user interface surface 151 to pivot the actuator member 155, such that the actuator member 155 exerts an actuating force on the switch member 135. When the force is applied to the user interface surface 151, the actuator member 155 pivots until the actuator surface 156 engages the switch member 135. Thus, the actuator member pivots such that it exerts a corresponding force on the switch member at a substantial angle with respect to the direction of the force exerted on the user interface surface.

The present invention provides significant advantages over the prior art. By providing a pivoting actuator button in a single-piece construction, an inexpensive actuator can be formed. The pivoting actuating button can be used in conjunction with inexpensive flat switches which are mounted on a circuit board. This combination enables the positioning of actuating buttons at various locations on the device housing while maintaining switches on the main circuit board in an inexpensive configuration.

What is claimed is:

1. An electronic device, comprising:
   a device housing;
   a circuit carrying substrate mounted within the device housing, the circuit carrying substrate having a surface with electrical components mounted thereon;
   a flat switch mounted on the surface, and having a direction of actuation substantially perpendicular to the surface;
   a plurality of pivotable button actuators each having a user interface portion, and having an actuator member positioned within the device housing, wherein the actuator member pivots from a first position adjacent to the switch to a second position engaging the switch when the user interface portion is depressed; and
   a shaft integrally attached to the plurality of pivotable button actuators and anchored within the device housing on either side of each pivotable button actuator, wherein each of the plurality of pivotable button actuators is pivotable to create a torque within the shaft, such that the shaft provides an opposing spring bias return force for the user interface portion and actuator member when the user interface portion is depressed.

2. The electronic device of claim 1, wherein the plurality of pivotable button actuators form a single-piece member comprising a resilient and elastic material.

3. The electronic device of claim 2, wherein the resilient and elastic material comprises a thermoplastic polycarbonate material.

4. An electronic device, comprising:
   a device housing;
   a circuit carrying substrate mounted within the device housing, the circuit carrying substrate having a surface with electrical components mounted thereon;
   a switch mounted on the surface of the circuit carrying substrate, and having an integral switch member movable in a first direction, which is normal to the surface of the circuit carrying substrate, the switch member causing actuation of the switch when depressed toward the surface of the circuit carrying substrate;
   a button mechanically coupled to the device housing, the button having an interface portion, accessible from a position external to the device housing, and depressible in a second direction substantially angled from the first direction, the button having a pivotable actuator portion positioned within the device housing, wherein the actuator portion pivots from a first position away from the switch member to a second position engaging and depressing the switch member, when the interface portion is depressed in the second direction; and
   a shaft anchored to the device housing, wherein the button is integrally attached to the shaft by a wall portion; and the interface portion and actuator member are pivotable to create a torque within the shaft, such that the shaft provides an opposing spring bias return force for the interface portion and actuator member when the interface portion is depressed in the second direction.

5. The electronic device of claim 4, wherein the button has a single-piece construction and is formed from a resilient and elastic material.

6. The electronic device of claim 5, wherein the button is pivotably anchored to the device housing.

7. The electronic device of claim 4, further comprising a plurality of discrete flat switches mounted on the surface of the circuit carrying substrate, and a plurality of buttons integrally attached to the shaft, each button having an actuator member pivotably positioned to actuate a corresponding switch of the plurality of discrete flat switches.

8. The electronic device of claim 7, wherein the plurality of buttons are integrally formed with the shaft from a resilient and elastic material in a single-piece construction.

9. A switch and button actuator assembly, comprising:
   an actuator, comprising:
   a shaft;
   a button attached to the shaft, the button having opposing first and second surfaces, the first surface forming a user interface surface, the button having an actuator member projecting from the second surface, the actuator member being pivotable to create a torque within the shaft that generates an opposing spring bias return force for the actuator member when the user interface surface is depressed;
   wherein the shaft and the button are integrally formed from a continuous material;
   a circuit carrying substrate having a surface with a switch mounted thereon, the switch having a switch member that causes actuation of the switch when depressed toward the surface of the circuit carrying substrate;

wherein the button is responsive to a force exerted in a first direction normal to the user interface surface, to pivot the actuator member, such that the actuator member exerts an actuating force on the switch member.

10. The switch and button actuator assembly of claim 9, wherein the actuator member exerts a force on the switch member in a second direction substantially normal to the first direction.

11. The switch and button actuator assembly of claim 10, wherein the actuator member has an actuator surface substantially perpendicular to the user interface surface, which actuator surface engages the switch member to provide the actuating force.

12. The switch and button actuator assembly of claim 9, wherein the actuator member exerts a force on the switch member in a second direction at a substantial angle with respect to the first direction.

13. The switch and button actuator assembly of claim 9, wherein the surface of circuit carrying substrate is planar, and the switch is flat mounted on the surface.

14. A radio, comprising:

a housing;

a radio control interface, comprising:

a shaft anchored to the housing;

a button attached to the shaft, the button having opposing first and second surfaces, the first surface forming a user interface surface that is externally exposed with respect to the housing, the button having an actuator member projecting from the second surface, the actuator member being pivotable to create an opposing spring bias return force within the shaft;

wherein the shaft and the button are integrally formed from continuous material; and a circuit carrying substrate mounted within the housing, the circuit carrying substrate having surface with a switch flat mounted thereon, the switch having a switch member that causes actuation of the switch when depressed toward the surface of the circuit carrying substrate;

wherein the button is responsive to a force exerted in a first direction normal to the user interface surface, to pivot the actuator member, such that the actuator member exerts an actuating force on the switch member.

15. The radio of claim 14, wherein the button has a single-piece construction and is formed from resilient and elastic material.

16. The radio of claim 14, further comprising a plurality of discrete switches mounted on the circuit carrying substrate, and a corresponding number of buttons integrally formed with the shaft from a continuous, resilient and flexible material.

* * * * *